US012629703B2

(12) United States Patent
Park et al.

(10) Patent No.: US 12,629,703 B2
(45) Date of Patent: May 19, 2026

(54) SPRAY NOZZLE DEVICE

(71) Applicant: APPLIED PLASMA INC., Gyeongsangbuk-do (KR)

(72) Inventors: Jae Beom Park, Daegu (KR); In Ho Choi, Gyeongsangbuk-do (KR)

(73) Assignee: APPLIED PLASMA INC., Gyeongsangbuk-Do (KR)

( * ) Notice: Subject to any disclaimer, the term of this patent is extended or adjusted under 35 U.S.C. 154(b) by 582 days.

(21) Appl. No.: 17/927,965

(22) PCT Filed: Dec. 31, 2021

(86) PCT No.: PCT/KR2021/020352
§ 371 (c)(1),
(2) Date: Nov. 28, 2022

(87) PCT Pub. No.: WO2022/191394
PCT Pub. Date: Sep. 15, 2022

(65) Prior Publication Data

US 2023/0219103 A1 Jul. 13, 2023

(30) Foreign Application Priority Data

Mar. 8, 2021 (KR) ........................ 10-2021-0030047

(51) Int. Cl.
*B05B 1/02* (2006.01)
*B05B 1/14* (2006.01)
*C23C 4/134* (2016.01)

(52) U.S. Cl.
CPC .................. *B05B 1/02* (2013.01); *B05B 1/14* (2013.01); *C23C 4/134* (2016.01)

(58) Field of Classification Search
CPC .... B05B 1/02; B05B 1/14; B05B 5/06; B05B 7/20; B05B 7/22; C23C 4/00; C23C 4/134
(Continued)

(56) References Cited

U.S. PATENT DOCUMENTS 3,892,882 A * 7/1975 Guest ........................ B05B 5/06 239/81
4,841,114 A * 6/1989 Browning ............... C23C 4/134 219/76.16
(Continued)

FOREIGN PATENT DOCUMENTS

EP 3 586 954 A1 1/2020
JP 2007-146281 A 6/2007
(Continued)

OTHER PUBLICATIONS

International Search Report for PCT/KR2021/020352 mailed on Jun. 15, 2022.

*Primary Examiner* — Steven J Ganey
(74) *Attorney, Agent, or Firm* — Nath, Goldberg & Meyer; Gregory Kang

(57) ABSTRACT

A spray nozzle device according to an embodiment includes a first nozzle having a first spray hole for spraying plasma, a second nozzle spaced apart from the first nozzle and having at least one second spray hole through which the plasma sprayed from the first nozzle passes, a coupling member spaced apart from the second nozzle and coupled to the first nozzle, and at least one connecting member connecting the second nozzle with the coupling member. The second nozzle includes at least one inflow channel for the injection of a deposition material into the second spray hole.

9 Claims, 8 Drawing Sheets

1

(58) Field of Classification Search
USPC ......... 239/79, 85, 135, 433, 434; 219/76.16, 219/121.5
See application file for complete search history.

(56) References Cited

U.S. PATENT DOCUMENTS

| | | | | |
|---|---|---|---|---|
| 5,556,558 | A * | 9/1996 | Ross | H05H 1/44 219/76.16 |
| 6,392,189 | B1 * | 5/2002 | Delcea | H05H 1/42 219/76.16 |
| 8,590,804 | B2 * | 11/2013 | Muggli | C23C 24/04 239/79 |

FOREIGN PATENT DOCUMENTS

| | | | |
|---|---|---|---|
| KR | 10-0860588 | B1 | 9/2008 |
| KR | 10-2015-0117569 | A | 10/2015 |
| KR | 10-2017-0014983 | A | 2/2017 |
| KR | 10-2019-0019600 | A | 2/2019 |

* cited by examiner

SPRAY NOZZLE DEVICE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/020352 filed on Dec. 31, 2021, which claims priority to the benefit of Korean Patent Application No. 10-2021-0030047 filed in the Korean Intellectual Property Office on Mar. 8, 2021, the entire contents of which are incorporated herein by reference.

BACKGROUND

1. Technical Field

The present invention relates to a spray nozzle device, and more specifically, to a spray nozzle device capable of spraying a mixture of plasma and various deposition materials.

2. Background Art

In general, a gas is ionized by voltage or heating, and the number density of electrons and ions may be remarkably increased. A state where a gas is ionized, that is, an ionized gas is called plasma.

In the manufacturing process of a flat panel display device including a liquid crystal display device and a semiconductor, the plasma is used in a plasma generator that is used for removing a photoresist used for patterning a metal material or a semiconductor layer by ashing treatment, for etching thin films formed of other organic materials or semiconductor materials, for a cleaning process for removing organic matters on a surface.

The plasma generator can generate plasma at atmospheric pressure and in a vacuum state, but the vacuum plasma generator has limitations in equipment and location for creating a vacuum state, so recently an atmospheric pressure plasma generator has been used.

The plasma can ionize deposition materials such as precursors, and the deposition materials ionized by the plasma can be easily deposited on a surface of a product. The ionized deposition material is deposited on the surface of the product, thereby forming a coating layer on the surface of the product. However, one plasma generator cannot deposit various deposition materials, such as precursors, on the surface of the product, so there is a problem in that a plurality of plasma generators are required to deposit various deposition materials.

In addition, when a deposition material inlet or a plasma spray hole of the plasma generator is clogged or has a problem due to powder generation, there is a problem in that an economic loss occurs due to a disruption in the process.

SUMMARY

An object of the present invention is to provide a spray nozzle device capable of spraying a mixture by mixing various deposition materials with plasma.

Another object of the present invention is to provide a spray nozzle device that does not cause a disruption in a process when a deposition material inlet or a plasma spray hole is clogged or has a problem due to powder.

The objects of the present invention may not be limited to the objects mentioned above, and other objects not mentioned will be clearly understood by those skilled in the art from the following description.

In order to achieve the objects of the present invention as described above and realize the technical effects of the present invention described below, the main configuration of the present invention is as follows.

According to one aspect of the present invention, there is provided a spray nozzle device including: a first nozzle having a first spray hole for spraying plasma; a second nozzle spaced apart from the first nozzle and having at least one second spray hole through which the plasma sprayed from the first nozzle passes; a coupling member spaced apart from the second nozzle and coupled to the first nozzle; and at least one connecting member connecting the second nozzle with the coupling member, wherein the second nozzle includes at least one inflow channel for injection of a deposition material into the second spray hole.

According to embodiments of the present invention, various deposition materials can be mixed with plasma. Therefore, coating layers of various deposition materials may be formed.

In addition, the present invention includes a plurality of deposition material inlets and a plurality of plasma spray holes, so that, when the deposition material inlets or plasma spray holes are clogged or have a problem, other deposition material inlets or plasma spray holes can be used to prevent disruption in the process.

The effects of the present invention are not limited to the effects mentioned above, and other effects not mentioned will be clearly understood by those skilled in the art from the description of the claims.

DETAILED DESCRIPTION

Figure 1:
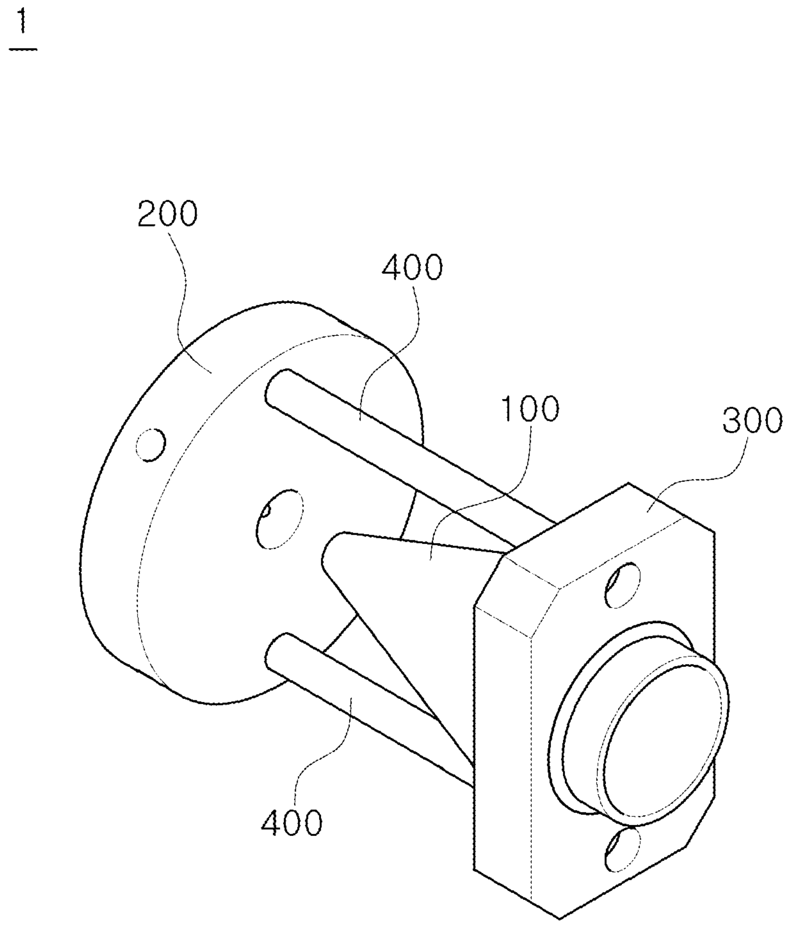
FIG. 1 is a perspective view for explaining a spray nozzle device according to an embodiment of the present invention.

The detailed description of the present invention described below will be made with reference to accompanying drawings which illustrate specific embodiments in which the present invention may be implemented. These embodiments will be described in detail to enable those skilled in the art to implement the present invention. It should be understood that the various embodiments of the present invention may be different from each other, but may not be necessarily exclusive from each other. For example, specific shapes, structures, and characteristics described in one embodiment may be implemented in other embodiments without departing from the spirit and scope of the present invention. Further, it should be understood that the location or arrangement of individual components within each disclosed embodiment may be changed without departing from the spirit and scope of the present invention. Accordingly, the detailed description set forth below is not to be taken in a limiting sense, and the scope of the present invention, if properly described, is limited only by the appended claims, along with all equivalents to the claims. Like reference numbers in the drawings indicate the same or similar function throughout the various aspects.

Hereinafter, preferred embodiments of the present invention will be described in detail with reference to the accompanying drawings so that those skilled in the art can easily implement the present invention.

Figure 2:
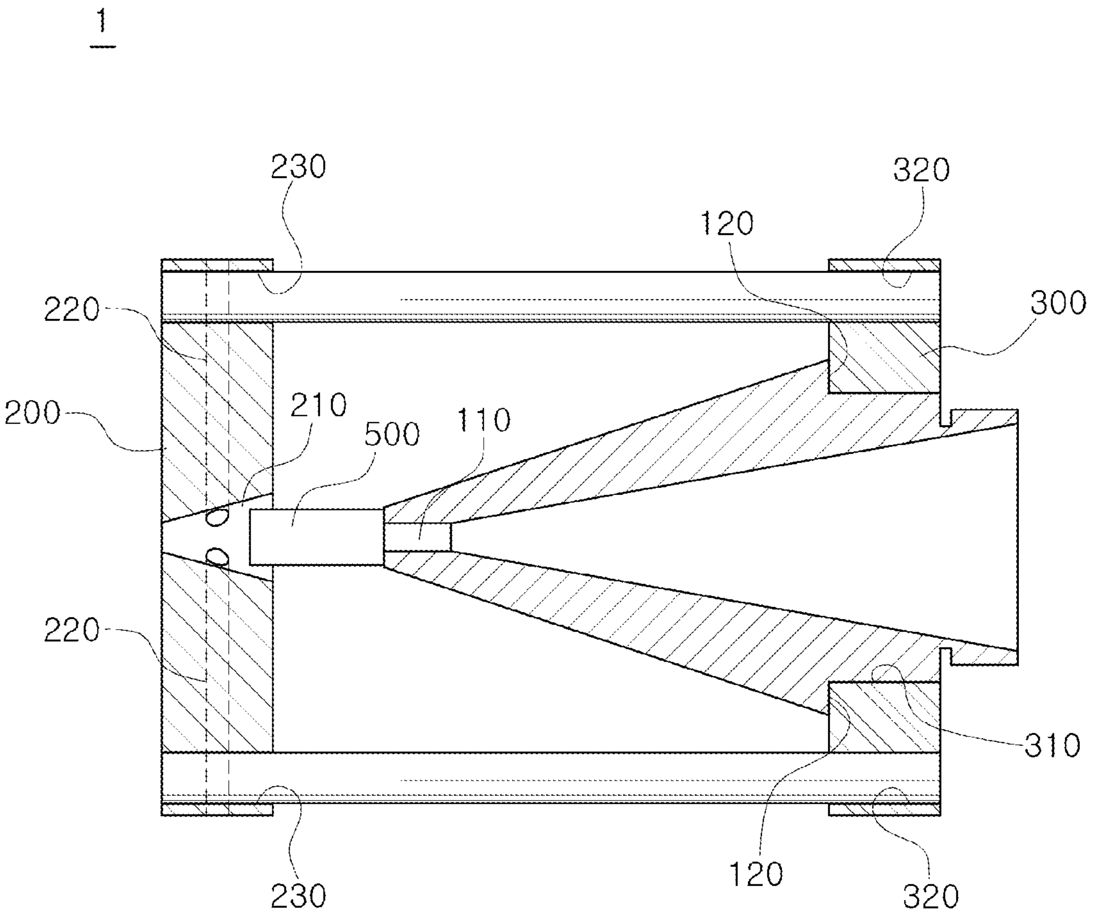
FIG. 2 is a sectional view of a spray nozzle device according to an embodiment of the present invention.

FIG. 1 is a perspective view for explaining a spray nozzle device 1 according to an embodiment of the present invention, and FIG. 2 is a sectional view of the spray nozzle device 1 according to an embodiment of the present invention.

Referring to FIGS. 1 to 2, a spray nozzle device 1 according to an embodiment of the present invention may include a first nozzle 100, a second nozzle 200, a coupling member 300, and a connecting member 400.

Hereinafter, the above components will be sequentially described.

The first nozzle 100 may include a first spray hole 110 for spraying plasma. The first nozzle 100 may include a cone-shaped inner space that is open at both ends thereof and has a width gradually narrowed from one end to the other end. The other end of the first nozzle 100 may include a screw thread. The first nozzle 100 may include a coupling jaw 120 that can be coupled to the coupling member 300. The coupling jaw 120 may be recessed into the first nozzle 100.

The second nozzle 200 may include at least one second spray hole 210 which is spaced apart from the first nozzle 100 and through which plasma sprayed from the first nozzle 100 passes. In addition, the second nozzle 200 may include at least one inflow channel 220 for injecting a deposition material such as a precursor into the second spray hole 210. In this case, at least one inflow channel 220 may be arranged along the outer surface of the second nozzle 200. If the second nozzle 200 includes a plurality of inflow channels 220, various deposition materials may be injected through the plurality of inflow channels 220 and mixed with the plasma. In addition, the second nozzle 200 may include an insertion portion 230 into which at least one connecting member 400 may be inserted.

The coupling member 300 may be spaced apart from the second nozzle 200 and coupled to the first nozzle 100. The coupling member 300 may include a coupling hole 310 in contact with the coupling jaw 120, and the coupling member 300 may be coupled to the first nozzle 100 as the coupling hole 310 is in contact with the coupling jaw 120. Further, the coupling member 300 may include a connecting portion 320 into which at least one connecting member 400 may be inserted.

In this case, the number of insertion portions 230 of the second nozzle 200 and connecting portions 320 of the coupling member 300 may be determined based on the number of connecting members 400.

At least one connecting member 400 may connect the second nozzle 200 and the coupling member 300. In this case, one end of the connecting member 400 may be inserted into the insertion portion 230 of the second nozzle 200, and the other end of the connecting member 400 may be inserted into the connecting portion 320 of the coupling member 300.

A plasma injection section 500 may be located between the first nozzle 100 and the second spray hole 210. The plasma injection section 500 may guide the plasma sprayed from the first spray hole 110 to the second spray hole 210. The plasma injection section 500 may be inserted into the second spray hole 210. Alternatively, the plasma injection section 500 may be adjacent to the second spray hole 210

In the embodiment, the spray nozzle device 1 may include a second nozzle 200 having a cylindrical shape. The second nozzle 200 may include one second spray hole 210 at the center of the second nozzle 200. Four inflow channels 220 may be located along the outer surface of the second nozzle 200 at intervals of 90 degrees. The four inflow channels 220 may have a shape extending toward the second spray hole 210. Accordingly, the plasma passing through the first spray hole 110 and the deposition material injected through the inflow channel 220 may be mixed in the second spray hole 210 and sprayed through the second spray hole 210.

At this point, the shape of the second nozzle 200 is not limited to the cylindrical shape, and various types of second nozzles 200 such as a hexahedral shape may be applied. The hexahedron-shaped second nozzle 200 may include an inflow channel 220 protruding from the outer surface of the second nozzle 200.

In the embodiment, the connecting members 400 may be provided as a pair, and the second nozzle 200 may include two insertion portions 230 into which the two connecting members 400 may be inserted. The two insertion portions 230 may be spaced apart from each other and have a symmetrical structure abut the second spray hole 210.

Further, in the embodiment, the connecting members 400 may be provided as a pair, and the coupling member 300 may include two connecting portions 320 into which the two connecting members 400 may be inserted. The two connecting portions 320 may be spaced apart from each other and have a symmetrical structure about the coupling hole 310.

Figure 3:
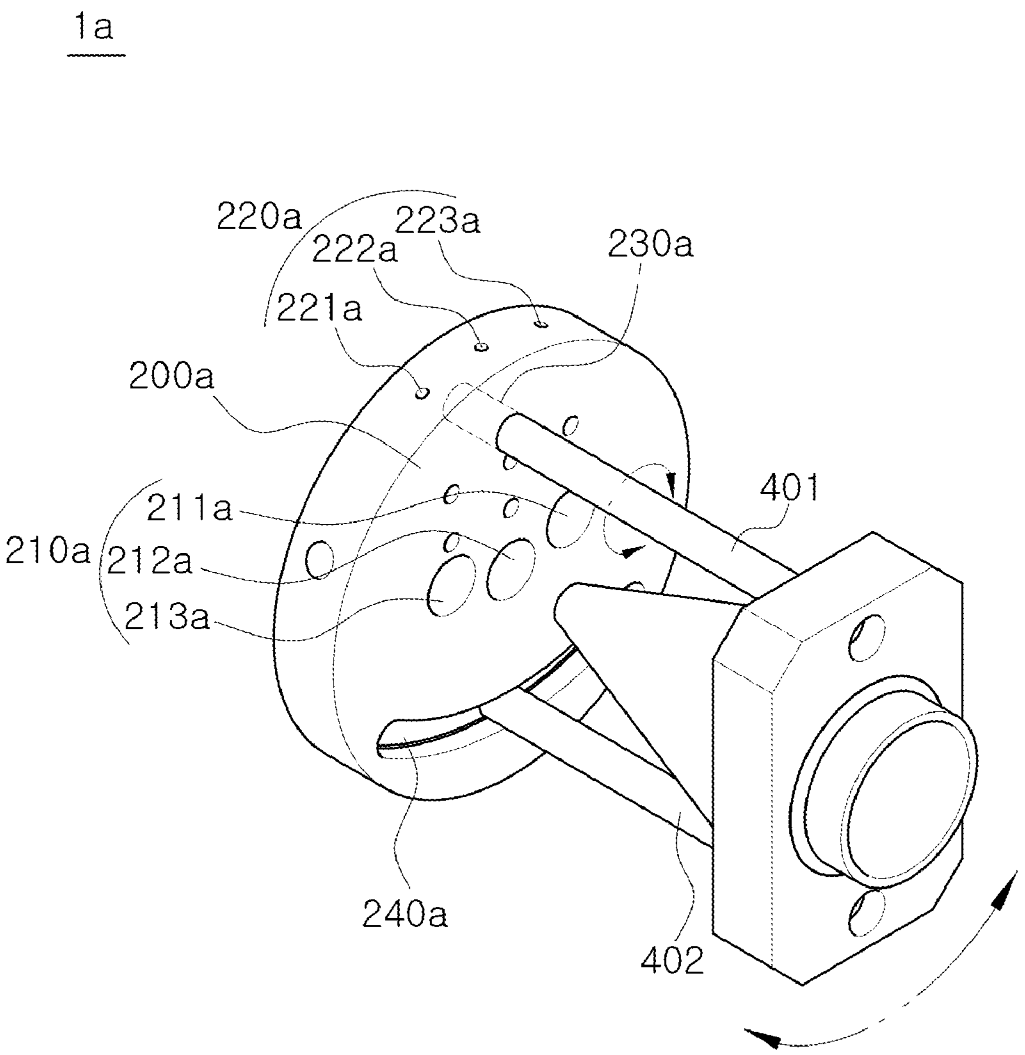
FIG. 3 is a perspective view of a nozzle spray device according to another embodiment of the present invention.
Figure 4:
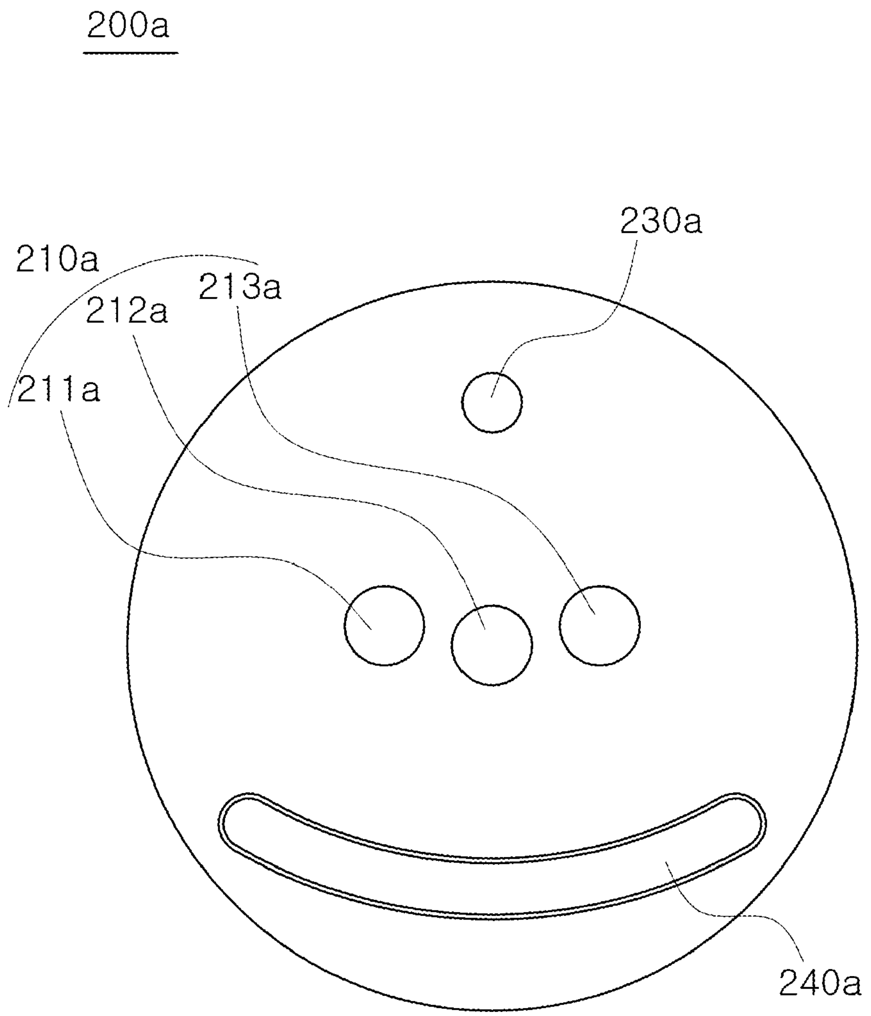
FIG. 4 is a side view of a second nozzle according to another embodiment of the present invention.

FIG. 3 is a perspective view of a nozzle spray device la according to another embodiment of the present invention, and FIG. 4 is a side view of a second nozzle 200*a* according to another embodiment of the present invention. For the purpose convenience of explanation, the description of the configuration the same as the configuration described with reference to FIGS. 1 and 2 will be omitted or briefly described.

Referring to FIGS. 3 and 4, the nozzle spray device 1*a* according to another embodiment may include a first nozzle 100, a second nozzle 200*a*, a coupling member 300, and a connecting member 400.

The second nozzle 200*a* may have a structure different from a structure of the second nozzle 200 described with reference to FIGS. 1 and 2. The second nozzle 200*a* may include a plurality of second spray holes 210*a*. Further, the second nozzle 200*a* may include a plurality of inflow channels 220*a*. Each of the inflow channels 220*a* may be connected to each of the plurality of second spray holes 210*a*. Each of the plurality of inflow channels is connected to each of the plurality of second spray holes 210*a* so that a deposition material such as a precursor may be injected into each of the second spray holes 210*a*. In this case, the inflow channel 220*a* connected to the second spray hole 210*a* may be vertical, but is not limited thereto, and may have various angles.

For example, when the second nozzle 200*a* includes three second spray holes 210*a* and three inflow channels 220*a* are formed in the outer circumferential surface of the second nozzle 200*a*, the three second spray holes 210*a* may be referred to as a second-1 spray hole 211*a*, a second-2 spray hole 212*a*, and a second-3 spray hole 213*a* from the left. In addition, the three inflow channels 220*a* may be referred to as a first inflow channel 221*a*, a second inflow channel 222*a*, and a third inflow channel 223*a* from the left. The second-1 spray hole 211*a* and the first inflow channel 221*a* may be connected vertically, the second-2 spray hole 212*a* and the second inflow channel 222*a* may be connected vertically, and the second-3 spray hole 212*a* and the third inflow channel 223*a* may be connected vertically.

The second nozzle 200*a* may include an insertion portion 230*a* into which one of the pair of connecting members 400 is inserted. In addition, the second nozzle 200*a* may include an arc-shaped rail portion 240*a* which is spaced apart from the insertion portion 230*a* and into which the other connecting member 400 is inserted.

The connecting member 400 inserted into the rail portion 240*a* may move along the rail portion 240*a* to move the first nozzle 100 connected to the coupling member 300 clockwise or counterclockwise. Accordingly, the first nozzle 100 may be moved clockwise or counterclockwise about the connecting member 400 inserted into the insertion portion 230*a*. In this case, the first nozzle 100 may be assembled and moved with a driving unit. Driving units capable of moving the first nozzle 100, such as a motor, may be included in the driving unit of the present invention.

A plurality of second spray holes 210*a* may be provided, and the plurality of second spray holes 210*a* may be positioned between the insertion portion 230*a* and the rail portion 240*a*. In addition, the plurality of second spray holes 210*a* may be arranged along the longitudinal direction of the rail portion 240*a*. For example, a plurality of second nozzles may be arranged along a circular arc direction. Accordingly, the first nozzle 100 moving in the clockwise or counterclockwise direction may spray plasma to the plurality of second spray holes 210*a*.

If one of the plurality of second spray holes 210*a* is clogged or has a problem due to plasma or deposition materials, another second spray hole 210*a* may be used among the plurality of second spray holes 210*a*.

For example, when the second nozzle 200*a* includes three second spray holes 210*a*, the three second spray holes may be referred to as a second-1 spray hole 211*a*, a second-2 spray hole 212*a*, and a second-3 spray hole 213*a* from the left. In this case, the second connecting member 402 inserted into the rail portion 240*a* may move along the rail portion 240*a* about the first connecting member 401 inserted into the insertion portion 230*a* of the second nozzle 200*a*. At this point, the coupling member 300, into which the first connecting member 401 and the second connecting member 402 are inserted, and the first nozzle 100 coupled with the coupling member 300 may move along the rail portion 240*a* together with the second connecting member 402. When the second connecting member 402 is positioned at the left end of the rail portion 240*a*, the first nozzle 100 may spray plasma to the second-1 spray hole 211*a*, when the second connecting member 402 is positioned at the right end of the rail portion 240*a*, the first nozzle 100*a* may spray plasma to the second-3 spray hole 213*a*, and when the second connecting member 402 is positioned at the center of the rail portion 240*a*, the first nozzle may spray plasma to the second-2 spray hole 212*a*. Thus, when the second-1 spray hole 211*a* is clogged or has a problem, plasma may be sprayed through the second-2 spray hole 212*a* or the second-3 spray hole 213*a*.

Figure 5:
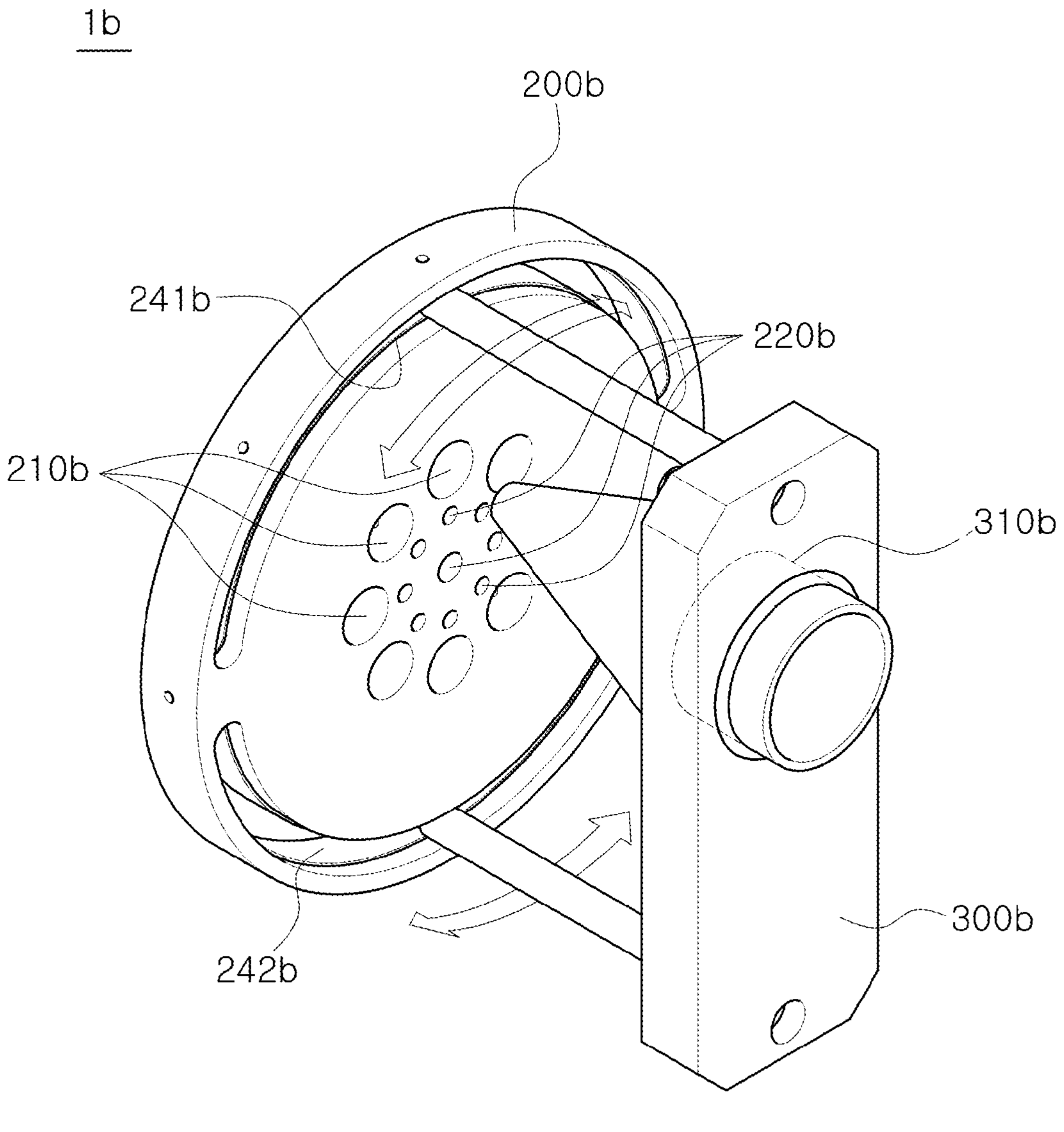
FIG. 5 is a perspective view of a nozzle spray device according to another embodiment of the present invention.
Figure 6:
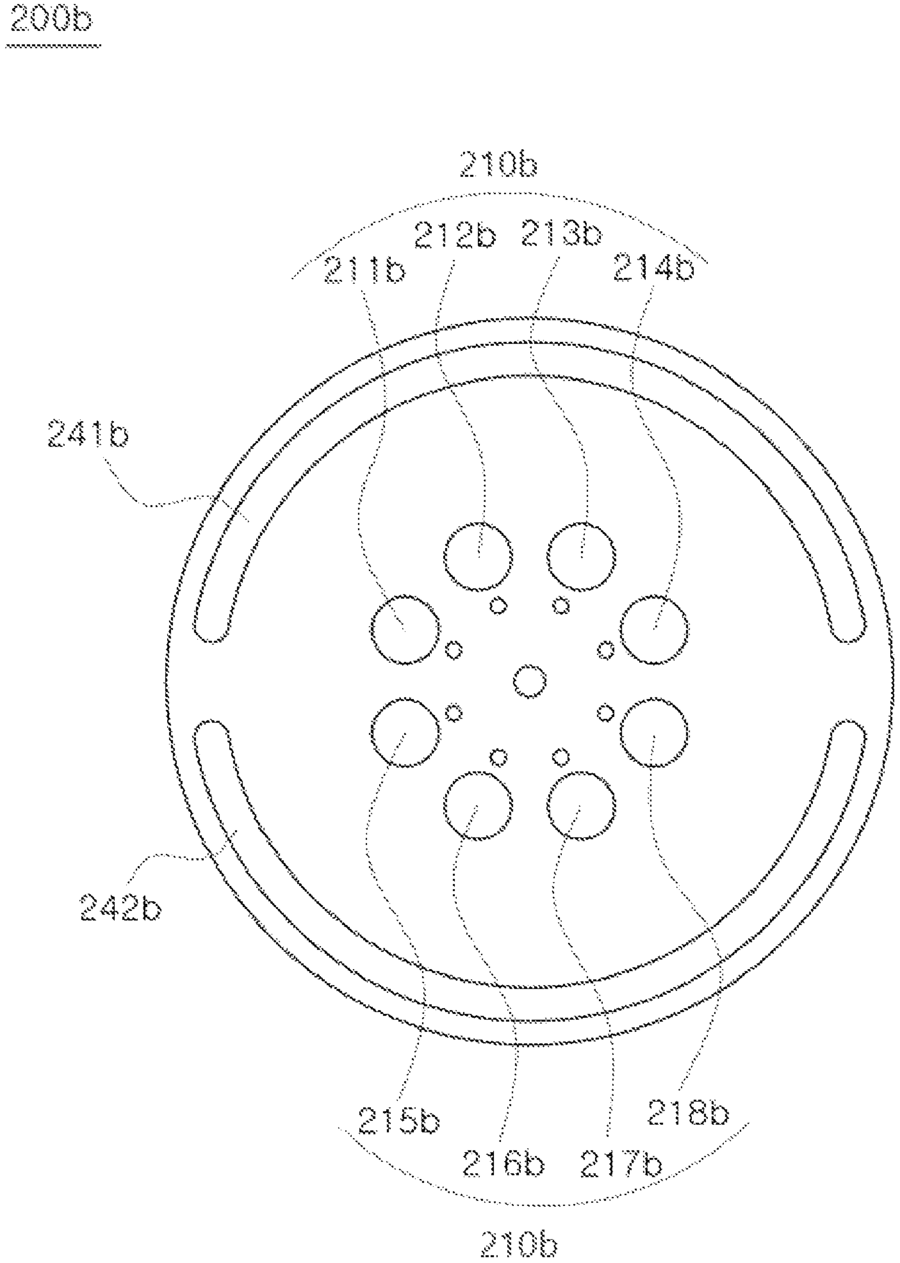
FIG. 6 is a side view of a second nozzle according to another embodiment of the present invention.

FIG. 5 is a perspective view of a nozzle spray device 1*b* according to another embodiment of the present invention, and FIG. 6 is a side view of a second nozzle 200*b* according to another embodiment of the present invention. For the purpose convenience of explanation, the description of the configuration the same as the configuration described with reference to FIGS. 1 to 4 will be omitted or briefly described.

Referring to FIGS. 5 and 6, the nozzle spray device 1*b* according to another embodiment may include a first nozzle 100, a second nozzle 200*b*, a coupling member 300*b*, and a connecting member 400.

The second nozzle 200*b* may have a structure different from a structure of the second nozzle 200 described with reference to FIGS. 1 and 2 and a structure of the second nozzle 200*a* described with reference to FIGS. 3 and 4. In another embodiment, the second nozzle 200*b* may include a plurality of second spray holes 210*b* and an inflow channel 220*b*. A plurality of second spray holes 210*b* and inflow channels 220*b* may be positioned while forming a circle in the central portion of the second nozzle 200*b*. In this case, the plurality of inflow channels 220*b* may be positioned while forming a circle smaller than a circle formed by the second spray holes 210*b*. Various deposition materials may be injected through the plurality of inflow channels 220*b* and mixed with the plasma.

Alternatively, the second nozzle 200*a* may include a plurality of second spray holes 210*a*. In this case, a plurality of inflow channels 220*a* may be located on the outer surface of the second nozzle 200*a* at regular intervals.

The second nozzle 200*b* may include an arc-shaped first rail portion 241*b* into which one of the pair of connecting members 400 is inserted. In addition, the second nozzle 200*b* may include an arc-shaped second rail portion 242*b* which is spaced apart from the first rail portion 241*b* and into which the other connecting member 400 is inserted. Each of the pair of connecting members 400 may move the first nozzle 100 clockwise or counterclockwise along the first rail portion 241*b* and the second rail portion 242*b*. A plurality of second spray holes 210*b* may be provided, and the plurality of second spray holes 210*b* may be positioned between the first rail portion 241*b* and the second rail portion 242*b*. The plurality of second spray holes 210*b* may be arranged along the longitudinal direction of the first rail portion 241*b* and the second rail portion 242*b*. In this case, the second spray hole 210*b* may be divided into an upper second spray hole 210*b*-1 arranged along the longitudinal direction of the first rail portion 241*b* and a lower second spray hole 210*b*-2 arranged along the longitudinal direction of the second rail portion 242*b*. The plurality of second spray holes 210*b* may have a vertically symmetrical structure about the central portion of the second nozzle 200*b*. The first nozzle 100 moving in the clockwise or counterclockwise direction may spray plasma to the plurality of second spray holes 210*b*.

The coupling member 300*b* may have a structure different from a structure of the coupling member 300 described with reference to FIGS. 1 to 4. In another embodiment, the coupling member 300*b* may include a coupling hole 310*b* spaced apart from the center of the coupling member 300*b* by a predetermined distance in the direction of the first rail portion 241*b*. The coupling jaw 120 of the first nozzle 100 may be assembled with the first nozzle 100 by making contact with the coupling hole 310*b* of the coupling member 300*b*. Thus, the first nozzle 100 may move in the clockwise or counterclockwise direction along the first rail portion 241*b* and the second rail portion 242*b* and spray the plasma to the second spray holes 210*b* arranged on an arc formed in the direction of the first rail portion 241*b*.

In addition, the coupling member 300*b* may include a coupling hole 310*b* spaced apart from the center of the coupling member 300*b* by a predetermined distance in the direction of the second rail portion 242*b*. The coupling jaw 120 of the first nozzle 100 may be assembled with the first nozzle 100 by making contact with the coupling hole 310*b* of the coupling member 300*b*. Thus, the first nozzle 100 may move in the clockwise or counterclockwise direction along the first rail portion 241*b* and the second rail portion 242*b* and spray the plasma to the second spray holes 210*b* arranged on an arc formed in the direction of the second rail portion 242*b*.

In this case, the position of the coupling hole 310*b* may be changed by disassembling each of the coupling members 400 from the first rail portion 241*b* and the second rail portion 242*b*, rotating the coupling member 300*b* by 180°, and inserting the connecting members 400 into the first rail portion 241*b* and the second rail portion 242*b*.

For example, when the second nozzle 200*b* includes eight second spray holes 210*b*, which are referred to as a second-1 spray hole 211*b*, a second-2 spray hole 212*b*, a second-3 spray hole 213*b*, and a 2-4 spray hole 214*b* from the left upper side of the second nozzle 200*b* and referred to as a second-5 spray hole 215*b*, a second-6 spray hole 216*b*, a second-7 spray hole 217*b*, and second-8 spray hole 218*b* from the left lower side of the second nozzle 200*b*, and when the coupling member 300*b* includes a coupling hole 310*b* at a position spaced by a certain distance from the central portion of the coupling member 300*b* in the direction of the first rail portion 241*b*, the first nozzle 100 may move in the clockwise or counterclockwise direction along the first rail portion 241*b* and the second rail portion 242*b* and spray the plasma to the second-1 spray hole 211*b*, the second-2 spray hole 212*b*, the second-3 spray hole 213*b*, and the 2-4 spray hole 214*b* arranged on an arc formed in the direction of the first rail portion 241*b*.

In addition, the coupling hole 310*b* of the coupling member 300*b* may be located at a position spaced by a certain distance from the central portion of the coupling member 300*b* in the direction of the second rail portion 242*b* by disassembling each of the connecting members 400 from the first rail portion 241*b* and the second rail portion 242*b*, rotating the coupling member 300*b* by 180°, and inserting the connecting members 400 into the first rail portion 241*b* and the second rail portion 242*b*. In this case, the second nozzle 200*b* may rotate in the clockwise or counterclockwise direction, and the first nozzle 100 may move in the clockwise or counterclockwise direction along the first rail portion 241*b* and the second rail portion 242*b* and spray the plasma to the second-5 spray hole 215*b*, the second-6 spray holes 216*b*, the second-7 spray holes 217*b*, and the second-8 spray hole 218*b* arranged on an arc formed in the direction of the second rail portion 242*b*.

Figure 8:
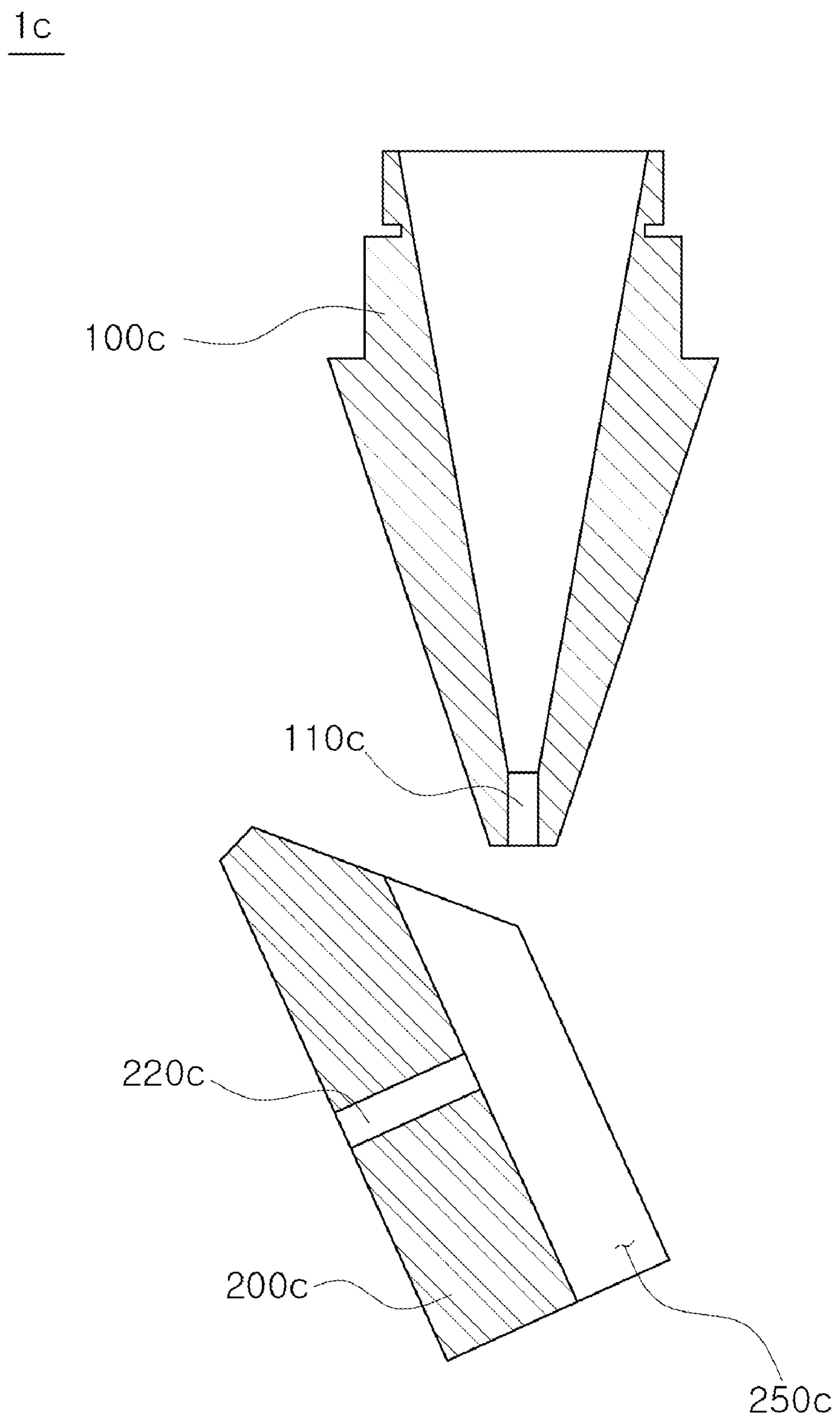
FIG. 8 is a front view of a spray nozzle device according to another embodiment of the present invention.

FIG. 8 is a front view of a spray nozzle device 1*c* according to another embodiment of the present invention.

Figure 7:
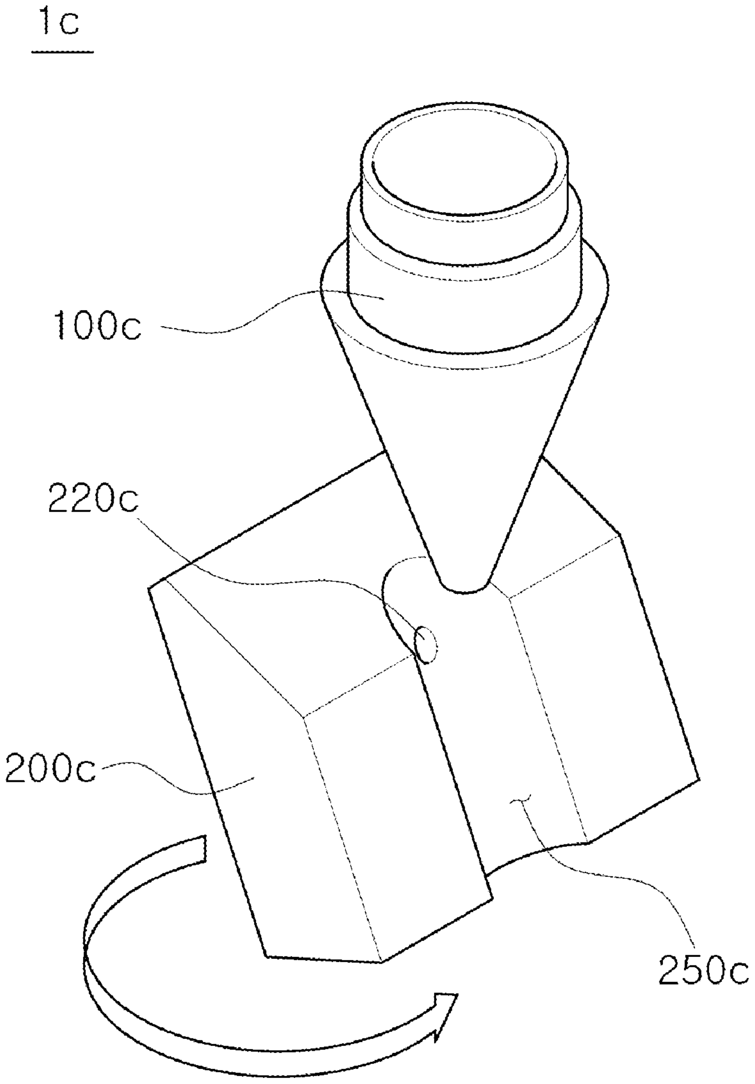
FIG. 7 is a perspective view of a spray nozzle device according to another embodiment of the present invention.

Referring to FIGS. 7 and 8, the spray nozzle device 1*c* according to another embodiment of the present invention may include a first nozzle 100*c* having a first spray hole 110*c* for spraying plasma. In addition, the spray nozzle device may include a second nozzle 200*c* including a guide channel 250*c* for changing the spray direction of the plasma sprayed from the first nozzle 100*c* and at least one inflow channel 220*c* for injecting deposition materials such as precursors. Further, the second nozzle 200*c* may be spaced apart from the first nozzle 100*c*. The second nozzle 200*c* may rotate. An inclination angle of the guide channel 250*c* may be changed through rotation of the second nozzle 200*c*. Thus, the plasma spraying direction of the second nozzle 200*c* may be changed.

The longitudinal direction of the second nozzle 200*c* may be inclined with the spraying direction of the first nozzle 100*c*. In addition, the longitudinal direction of the guide channel 250*c* may be inclined with the spraying direction of the first nozzle 100*c*. The guide channel 250*c* may be prepared in the form of a semicircular hole. At least one inflow channel 220*c* may form a predetermined angle with respect to the guide channel 250*c*. At least one inflow channel 220*c* may be prepared in the form of a hole extending toward the guide channel 250*c*.

The first nozzle 100*c* may spray the plasma to a point where the guide channel 250*c* intersects the inflow channel 220*c*.

The present invention has been described with reference to specific details such as specific components, limited embodiments, and drawings, but these are provided only to help a more general understanding of the present invention, and the present invention is not limited to the above embodiments, and those skilled in the art to which the present invention pertains may provide various modifications and variations from the above descriptions.

Therefore, the spirit of the present invention should not be limited to the above-described embodiments, and it should be said that not only the claims to be described later, but also all modifications equivalent to the claims belong to the scope of the spirit of the present invention.

What is claimed is:

1. A spray nozzle device comprising:
a first nozzle having a first spray hole for spraying plasma;
a second nozzle spaced apart from the first nozzle, the second nozzle having at least one second spray hole through which the plasma sprayed from the first nozzle passes, the second nozzle including at least one inflow channel for injection of a deposition material into the at least one second spray hole;
a coupling member spaced apart from the second nozzle and coupled to the first nozzle; and
at least one connecting member connecting the second nozzle with the coupling member,
wherein the connecting member comprises a pair of connecting members, and the second nozzle includes:
an insertion portion into which one of the pair of connecting members is inserted; and
a rail portion having an arc shape that is spaced apart from the insertion portion and into which remaining one of the connecting members is inserted,
and wherein the connecting member inserted into the rail portion is configured to move along the rail portion to move the first nozzle clockwise or counterclockwise.

2. The spray nozzle device of claim 1,
wherein the second spray hole comprises a plurality of second spray holes; and
the plurality of second spray holes are located between the insertion portion and the rail portion and arranged along a longitudinal direction of the rail portion.

3. The spray nozzle device of claim 1,
wherein the connecting member comprises a pair of connecting members;
wherein the second nozzle includes:
an arc-shaped first rail portion into which one of the pair of connecting members is inserted; and
an arc-shaped second rail portion spaced apart from the first rail portion and into which remaining one of the pair of connecting members is inserted;
and wherein each of the connecting members is configured to move the first nozzle clockwise or counterclockwise along the first rail portion and the second rail portion.

4. The spray nozzle device of claim 3,
wherein the second spray hole comprises a plurality second spray holes;
the plurality of second spray holes are located between the first rail portion and the second rail portion; and
the second spray holes are arranged along a longitudinal direction of the first rail portion and a longitudinal direction of the second rail portion.

5. The spray nozzle device of claim 1, wherein the second nozzle includes a plurality of inflow channels arranged along an outer surface of the second nozzle.

6. The spray nozzle device of claim 1, further comprising a plasma spray section located between the first nozzle and the second spray hole to guide the plasma sprayed from the first spray hole to the second spray hole.

7. The spray nozzle device of claim 1, wherein the at least one of the inflow channel is formed within a body of the second nozzle.

8. A spray nozzle device comprising:
a first nozzle having a first spray hole for spraying plasma;
a second nozzle spaced apart from the first nozzle, the second nozzle including a guide channel for changing a spray direction of the plasma sprayed from the first nozzle and at least one inflow channel for injection of a deposition material into the guide channel, a coupling member spaced apart from the second nozzle and coupled to the first nozzle; and at least one connecting member connecting the second nozzle with the coupling member; and
wherein the connecting member comprises a pair of connecting members, the second nozzle including an insertion portion into which one of the pair of connecting members is inserted and a rail portion having an arc shape that is spaced apart from the insertion portion and into which remaining one of the connecting members is inserted,
wherein a longitudinal direction of the guide channel is inclined with respect to the spray direction of the first nozzle,
and wherein the connecting member inserted into the rail portion is configured to move along the rail portion to move the first nozzle clockwise or counterclockwise.

9. The spray nozzle device of claim 8, wherein the at least one of the inflow channel is formed within a body of the second nozzle.

* * * * *